United States Patent
Son et al.

(10) Patent No.: US 11,027,715 B2
(45) Date of Patent: Jun. 8, 2021

(54) METHOD AND SYSTEM FOR VERIFYING NORMAL OPERATION OF NEGATIVE PRESSURE SENSOR OF BRAKE BOOSTER

(71) Applicants: Hyundai Motor Company, Seoul (KR); Kia Motors Corporation, Seoul (KR)

(72) Inventors: Young-Kyun Son, Gyeonggi-do (KR); Hee-Sung Yoon, Seoul (KR); Sung-Hyun Cho, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 345 days.

(21) Appl. No.: 16/179,905

(22) Filed: Nov. 3, 2018

(65) Prior Publication Data
US 2019/0308598 A1 Oct. 10, 2019

(30) Foreign Application Priority Data
Apr. 5, 2018 (KR) .................. 10-2018-0039763

(51) Int. Cl.
| | | |
|---|---|---|
| B60T 13/66 | (2006.01) | |
| B60T 13/72 | (2006.01) | |
| B60R 7/04 | (2006.01) | |
| B60T 17/02 | (2006.01) | |
| B60T 7/04 | (2006.01) | |

(52) U.S. Cl.
CPC ............ B60T 13/662 (2013.01); B60T 13/72 (2013.01); B60T 7/042 (2013.01); B60T 17/02 (2013.01)

(58) Field of Classification Search
CPC ........ B60T 13/662; B60T 13/72; B60T 7/042; B60T 17/02
See application file for complete search history.

(56) References Cited

U.S. PATENT DOCUMENTS

| | | | | |
|---|---|---|---|---|
| 6,305,757 | B1* | 10/2001 | Ohsaki | ............... B60T 17/02 303/114.3 |
| 9,527,490 | B2 | 12/2016 | Sekiya et al. | |
| 2006/0288766 | A1* | 12/2006 | Wang | ............... G01L 27/007 73/114.37 |
| 2010/0193311 | A1* | 8/2010 | Calnek | ............... B60T 13/57 188/357 |

FOREIGN PATENT DOCUMENTS

| | | |
|---|---|---|
| JP | H10157613 A | 6/1998 |
| JP | 2010116067 A | 5/2010 |
| JP | 2010143543 A | 7/2010 |
| JP | 2011098655 A | 5/2011 |
| JP | 2016113022 A | 6/2016 |
| JP | 2016124321 A | 7/2016 |
| KR | 2005-0118397 A | 12/2005 |

* cited by examiner

*Primary Examiner* — Navid Ziaeianmehdizadeh
*Assistant Examiner* — Sean P Quinn
(74) *Attorney, Agent, or Firm* — Mintz Levin Cohn Ferris Glovsky and Popeo, P.C.; Peter F. Corless

(57) ABSTRACT

A method and a system for verifying normal operation of a negative pressure sensor of a brake booster is provided. The method and system verify whether the negative pressure sensor of the brake booster is in normal operation and the normal operation of the booster negative pressure sensor is detected by mutually verifying values measured by the booster negative pressure sensor and values measured by sensors that indirectly sense the booster negative pressure.

18 Claims, 13 Drawing Sheets

METHOD AND SYSTEM FOR VERIFYING NORMAL OPERATION OF NEGATIVE PRESSURE SENSOR OF BRAKE BOOSTER

CROSS-REFERENCE(S) TO RELATED APPLICATIONS

This application claims priority to Korean Patent Application No. 10-2018-0039763, filed on Apr. 5, 2018, the disclosure of which is incorporated herein by reference in its entirety.

BACKGROUND

Field of the Invention

The present invention relates to a method and a system for verifying normal operation of a negative pressure sensor of a brake booster and more particularly, to a method and a system for verifying normal operation of a negative pressure sensor of a brake booster to robust verification of normal operation of the booster negative pressure sensor by monitoring values directly detected by the booster negative pressure sensor with values detected indirectly using sensors provided in a vehicle when determining negative pressure of the booster.

Description of the Related Art

Generally, a brake booster of a motor vehicle is a brake assist system for reducing an engagement force on a brake pedal, that is, tread force, by applying negative pressure, force of compressed air, or the like of an engine in addition to the engagement force on the brake pedal and thereby increasing the braking force. Such a brake booster includes a booster negative pressure sensor and supplements deficient braking force by determining a vacuum degree of the booster using the booster negative pressure sensor. When the vacuum of the booster is insufficient and thus braking force is insufficient, an electronic stability control (ESC) applies hydraulic pressure to the booster.

In addition, a low vacuum brake assist (LVBA) supplements insufficient braking force by determining a vacuum degree of the booster through the booster negative pressure sensor and, when vacuum of the booster is insufficient and thus braking force is insufficient, the ESC applies hydraulic pressure to the booster. However, since only the booster negative pressure sensor is utilized when determining negative pressure of the booster, there is a high dependency on the booster negative pressure sensor and thus, there is a possibility of generating either an excess or insufficient unintended braking force during malfunction or failure of the booster negative pressure sensor. Therefore, although it is possible to implement function of LVBA, it is necessary to secure robustness of verification on malfunction and normal operation of the booster negative pressure sensor in terms of functional safety.

However, the addition of more booster negative pressure sensors increases the manufacturing cost and overall weight. Similarly, the addition of a pedal stroke sensor is also problematic in that the manufacturing cost and overall weight will be increased. Further, although it may be possible to secure robustness of malfunction prevention through changing a specification of the booster negative pressure sensor, cost and weight of the booster negative pressure sensor will be increased. The additional application of a digital type sensor including a redundancy circuit is also problematic in that the manufacturing cost and overall weight will be increased. As a result, in the prior art, it is impossible to achieve requirements for functional safety.

Therefore, in implementing the function of LVBA, there is a need for a solution for enhancing verification of normal operation of the booster negative pressure sensor and preventing malfunction by securing redundancy by monitoring values directly detected by the booster negative pressure sensor with values detected indirectly using sensors already mounted within a vehicle when determining the booster negative pressure.

SUMMARY

The present invention provides a method and a system for verifying normal operation of a negative pressure sensor of a brake booster (hereinafter a booster negative pressure sensor) that enhance safety by promoting robustness of verification of malfunction and normal operation of the booster negative pressure sensor by monitoring values directly detected by the booster negative pressure sensor with values detected indirectly using sensors mounted within a vehicle when determining the negative pressure of the booster (hereinafter booster negative pressure).

Other objects and advantages of the present invention may be understood by the following description and become apparent with reference to the exemplary embodiments of the present invention. Also, it is obvious to those skilled in the art to which the present invention pertains that the objects and advantages of the present invention may be realized by the means as claimed and combinations thereof.

In accordance with one aspect of the present invention, a method for verifying normal operation of a negative pressure sensor of a brake booster may include: identifying whether values of the booster negative pressure sensor, an intake-manifold pressure sensor and an atmospheric pressure sensor are detected respectively; detecting a brake lamp switch (BLS), main cylinder pressure (MCP), atmospheric pressure, intake-manifold pressure, booster negative pressure and booster vacuum pressure; distinguishing compensation factors for compensating a malfunction of the booster negative pressure sensor based on any combination of the BLS, the MCP, the atmospheric pressure, the intake-manifold pressure, the booster negative pressure and the booster vacuum pressure and then determining any one of a low stuck-at condition, a high stuck-at condition and an offset error condition of the booster negative pressure sensor based on the compensation factors; and switching a low vacuum brake assist (LVBA) that has used values of the booster negative pressure sensor in the low stuck-at condition, the high stuck-at condition, or the offset error condition to a non-control state.

The method may further include determining whether values measured by the booster negative pressure sensor and values measured by elements for sensing indirectly the booster negative pressure are normal. The booster negative pressure sensor may be determined to be in the low stuck-at condition based on the BLS, the MCP, the atmospheric pressure, the intake-manifold pressure and the booster negative pressure.

Additionally, a failure determination condition when the booster negative pressure sensor is in the low stuck-at condition may include determining a failure based on the BLS being turned off, set pressure of the MCP, pressure obtained by adding pressure obtained by subtracting the atmospheric pressure from the intake-manifold pressure to the booster negative pressure under a non-braking state and repetition of change amounts of the booster negative pressure within a set value. The failure determination condition may also include when the pressure of the MCP is less than the set pressure and greater than the pressure obtained by adding the pressure obtained by subtracting the atmospheric pressure from the intake-manifold pressure to the booster negative pressure under the non-braking state and the change amounts of the booster negative pressure is repeated within the set value. The repetition within the set value may be based on that the change amounts are less than the set value for a predetermined time.

The booster negative pressure sensor may be determined to be in the high stuck-at condition based on the MCP, the atmospheric pressure, the intake-manifold pressure and the booster negative pressure. A failure determination condition when the booster negative pressure sensor is in the high stuck-at condition may include determining a failure based on the pressure obtained by subtracting the atmospheric pressure from the intake-manifold pressure, pressure obtained by subtracting a predetermined pressure from the booster negative pressure sensor, pressure obtained by subtracting a change amount of the atmospheric pressure from the intake-manifold pressure and repetition of change amounts of the booster negative pressure within a set value.

Additionally, the failure determination condition may be when the pressure of the MCP is less than the set pressure and greater than the pressure obtained by adding the pressure obtained by subtracting the atmospheric pressure from the intake-manifold pressure to the booster negative pressure under the non-braking state and the change amounts of the booster negative pressure are repeated within the set value. The repetition within the set value may be based on that the change amounts are less than the set value for a predetermined time.

Occurrence of the offset error condition of the booster negative pressure sensor may be determined based on the BLS, the MCP, the atmospheric pressure, the intake-manifold pressure, the booster negative pressure and the booster vacuum pressure. The failure determination condition when the booster negative pressure sensor is in the offset error condition may include determining a failure based on the BLS being turned off, set pressure of the MCP, the pressure obtained by adding the pressure obtained by subtracting the atmospheric pressure from the intake-manifold pressure to the booster negative pressure, the pressure obtained by subtracting the atmospheric pressure from the intake-manifold pressure, the booster negative pressure, charging of the booster negative pressure from the intake-manifold pressure, and repetition of the booster negative pressure and the intake-manifold pressure within a set value.

Additionally, the failure determination condition may be when the BLS is turned off; the MCP is less than the set pressure; the pressure obtained by subtracting the atmospheric pressure from the intake-manifold pressure is greater than pressure obtained by adding a predetermined pressure to the booster vacuum pressure; the pressure obtained by subtracting the atmospheric pressure from the intake-manifold pressure is changed above the set value; the pressure obtained by subtracting the atmospheric pressure from the intake-manifold pressure is reduced and less than the booster negative pressure; and the booster negative pressure is determined as being maintained stable since the booster negative pressure is changed below the set value and thus charge of the booster negative pressure from the intake-manifold pressure may be determined as having been completed and a difference above a set value between the booster negative pressure and the intake-manifold pressure may be repeated within the set value.

The repetition within the set value may be based on a condition that the difference is equal to or greater than the set value for a predetermined time. A failure may be detected when the offset error of the booster negative pressure sensor is in an offset low, when the offset error is in an offset high, or when the offset error is in an offset high and the pressure obtained by subtracting the atmospheric pressure from the intake-manifold pressure is increased. The method may further include compensating malfunction of the booster negative pressure sensor by using malfunction compensation factors when the booster negative pressure sensor is in the offset error condition.

In accordance with another aspect of the present invention, a system for verifying normal operation of a negative pressure sensor of a brake booster may include: a controller configured to receive signals from a booster pressure sensor mounted within the brake booster, an atmospheric pressure sensor and an intake-manifold pressure sensor; a data map for transmitting and receiving data to and from the controller; a BLS and an MCP configured to transmit a signal to the controller; and an electronic stability control (ESC) configured to transmit a signal to the controller, wherein normal operation of the booster negative pressure sensor may be verified by mutually verifying values measured by the booster negative pressure sensor and values measured by elements for indirectly sensing the booster negative pressure. The system may further include a global positioning system (GPS) sensor configured to measure the altitude and a temperature sensor configured to measure the outside temperature.

According to an exemplary embodiment of the present invention, the method and the system for verifying normal operation of a negative pressure sensor of a brake booster may provide advantageous effects that robustness of malfunction and failure detection of the booster negative pressure sensor may be improved by monitoring values directly detected by the booster negative pressure sensor with values detected indirectly using sensors mounted within a vehicle when negative pressure of the booster is determined and thus the cost may be reduced and safety may be enhanced.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
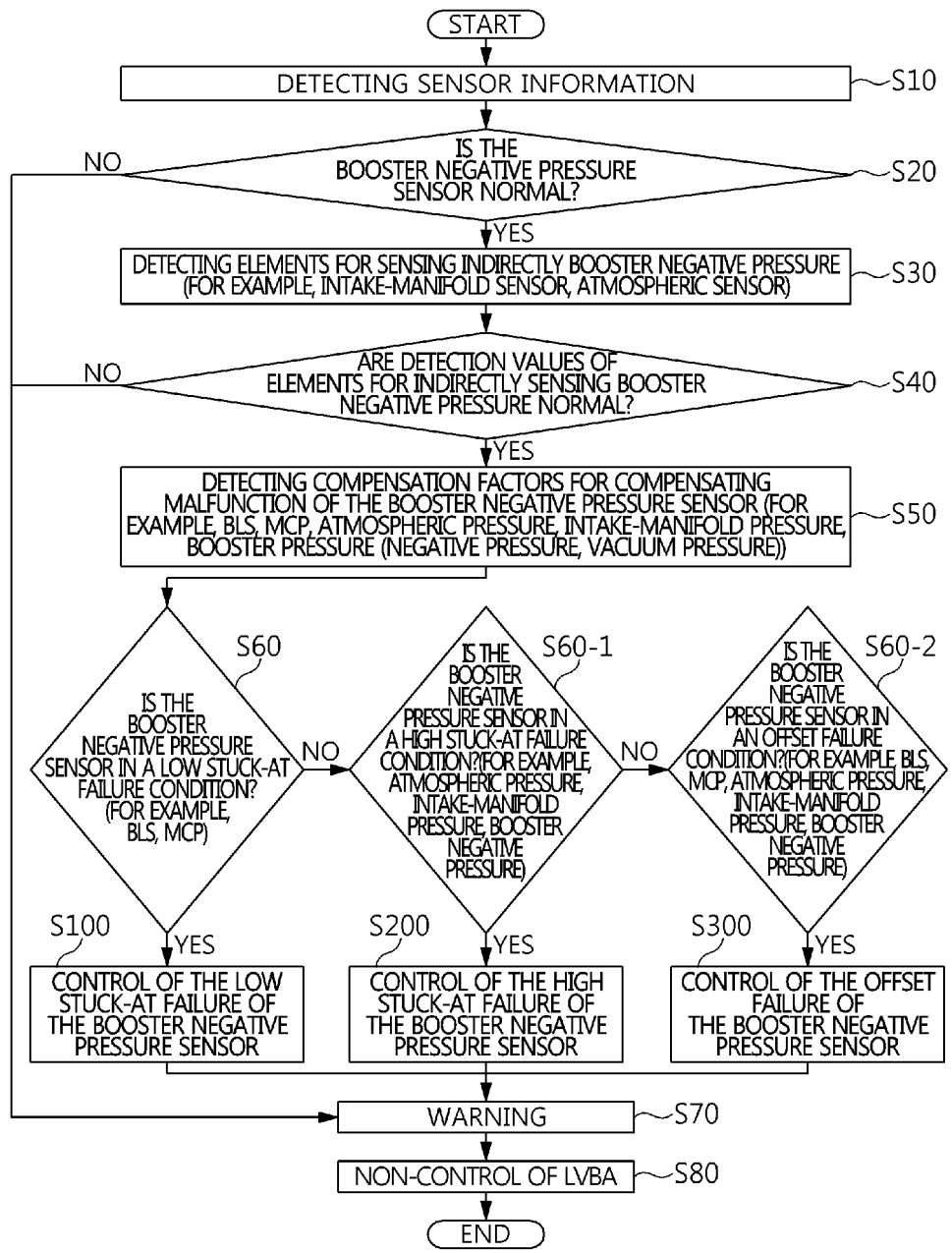
FIG. 1 is a flowchart of a method for verifying normal operation of a negative pressure sensor of a brake booster according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments described below are provided in order for those skilled in the art to easily understand the technical spirit of the present invention and the present invention is not limited thereto. In addition, contents represented in the accompanying drawings are diagrammed in order to easily describe the exemplary embodiments of the present invention and may be different from configurations actually implemented. It is to be understood that when a component is referred to as being coupled or connected to the other component, it may be directly coupled or connected to the other component but there may be another component interposed therebetween.

The term "connection" as used herein includes direct connection and indirect connection between a member and another member and may mean all physical connections such as adhesion, attachment, fastening, bonding and coupling. In addition, the expressions such as "first," "second," etc. are used only to distinguish a plurality of components but not limit the order of the components or other features.

FIG. 1 is a flowchart of a method for verifying normal operation of a negative pressure sensor of a brake booster according to an exemplary embodiment of the present invention. The method described herein below may be executed by a controller having a processor and a memory.

Referring to FIG. 1, the method for verifying normal operation of a negative pressure sensor of a brake booster according to an exemplary embodiment of the present invention may include: identifying whether values of the booster negative pressure sensor, an intake-manifold pressure sensor and an atmospheric pressure sensor are detected respectively; detecting a brake lamp switch (BLS) (e.g., whether the switch is on or off), main cylinder pressure (MCP), atmospheric pressure, intake-manifold pressure, booster negative pressure and booster vacuum pressure; distinguishing compensation factors for compensating malfunction of the booster negative pressure sensor based on any combination of the BLS, the MCP, the atmospheric pressure, the intake-manifold pressure, the booster negative pressure and the booster vacuum pressure and then determining any one of a low stuck-at condition, a high stuck-at condition and an offset error condition of the booster negative pressure sensor based on the compensation factors; and switching a low vacuum brake assist (LVBA) that has used values of the booster negative pressure sensor in the low stuck-at condition, the high stuck-at condition, or the offset error condition to a non-control state. The failure determination condition when the booster negative pressure sensor is in the low stuck-at condition may include determining a failure based on the BLS being turned off, set pressure of the MCP, pressure obtained by adding pressure obtained by subtracting the atmospheric pressure from the intake-manifold pressure to the booster negative pressure under a non-braking state and repetition of change amounts of the booster negative pressure within a set value, and the failure determination condition may be when the pressure of the MCP is less than the set pressure and greater than the pressure obtained by adding the pressure obtained by subtracting the atmospheric pressure from the intake-manifold pressure to the booster negative pressure under the non-braking state and the change amounts of the booster negative pressure are repeated within the set value, respectively. That is, the low condition is low measured values of the booster negative pressure sensor and the high condition is high measured values of the booster negative pressure sensor. In addition, a non-control state is to terminate without performing control of the low vacuum brake assist (LVBA).

In particular, the method may verify the normal operation of the booster negative pressure sensor (e.g., where normal refers to no malfunction or failure) by mutually verifying values measured by the booster negative pressure sensor and values measured by elements for sensing indirectly the booster negative pressure. First, information of a booster negative pressure sensor may be detected in step S10 and whether a value detected by the booster negative pressure sensor is normal may be determined in step S20. For example, as a controller is an electrical control device for determining whether a value of the sensor is normal, a normal value of the sensor is value during normal operation of the sensor.

Accordingly, the method may include measuring booster negative pressure by the booster negative pressure sensor, measuring intake-manifold pressure by an intake-manifold pressure sensor, and measuring atmospheric pressure by an atmospheric pressure sensor. The detection values of elements for indirectly sensing the booster negative pressure may be detected to verify values measured by the booster negative pressure in step S30 and whether the detection values of the elements for indirectly sensing the booster negative pressure are normal may be determined in step S40. In particular, the components configured to indirectly sense the booster negative pressure may be, for example, the intake-manifold sensor, the atmospheric pressure sensor, a GPS sensor and a temperature sensor.

The booster negative pressure measured by the booster negative pressure sensor and the pressure obtained by subtracting the intake-manifold pressure from the atmospheric pressure may be compared with each other and, when values measured by the booster negative pressure sensor and detection values sensors configured to indirectly sense the booster negative pressure are normal, then compensation factors for compensating malfunction of the booster negative pressure sensor may be detected in step S50. In particular, the compensation factor for compensating malfunction of the booster negative pressure sensor may include, for example, BLS, MCP, atmospheric pressure, intake-manifold pressure and booster pressure wherein the booster pressure may be divided into booster negative pressure and booster vacuum pressure.

In a particular example, after the values measured by the booster negative pressure sensor, the detection values of the various sensors and the compensation factors for compensating malfunction of the booster negative pressure sensor are detected, a condition for normal operation of the booster negative pressure sensor may be determined.

In determining the failure condition of the booster negative pressure sensor according to the present invention, whether the booster negative pressure sensor is in a low stuck-at failure condition may be determined in step S60. The low stuck-at failure condition refers to the state in which the sensor is stuck at low. In particular, the condition for detecting a failure at the time when the booster negative pressure sensor is stuck at low, may include detecting a failure when the pressure obtained by subtracting the intake-manifold pressure from the atmospheric pressure is greater than the pressure obtained by adding a predetermined pressure to the booster negative pressure and change amounts of the booster negative pressure are repeated below a set value for a predetermined time. For example, when the BLS is turned off and MCP pressure condition is within the failure condition, control of the low stuck-at failure of the booster negative pressure sensor may be performed in step S100. A "low" means lower than the normal value and a "high" means higher than the normal value during operations of the sensors.

However, whether the booster negative pressure sensor is in the low stuck-at failure condition may be determined in step S60 and when the booster negative pressure sensor is determined as not being in the failure condition, then whether the booster negative pressure sensor is in a high stuck-at failure condition may be determined in step S60-1. In particular, the high stuck-at failure condition refers the state that the sensor is stuck at high. The condition for detecting a failure at the time when the booster negative pressure sensor is stuck at high, may include detecting a failure when the pressure obtained by subtracting a change amount of the atmospheric pressure from the intake-manifold pressure is less than set pressure and change amounts of the booster negative pressure are repeated multiple times below a set value for a predetermined time.

For example, in response to determining whether the atmospheric pressure, the intake-manifold pressure, and the booster negative pressure are within the failure condition and, as a result, the booster negative pressure sensor is in the high stuck-at failure condition, control of the high stuck-at failure of the booster negative pressure sensor may be performed in step S200. However, in response to determining that the booster negative pressure sensor is not in the high stuck-at failure condition, then whether the booster negative pressure sensor is in an offset failure condition may be determined in step 60-2. Particularly, the offset failure condition refers to the offset error condition in which a failure may be detected when offset error of the booster negative pressure sensor occurs and after obtaining the booster negative pressure, change amounts of the booster negative pressure are repeated multiple times below a set value.

For example, in response to determining whether the BLS is on or off, the MCP, the atmospheric pressure, the intake-manifold pressure, and the booster vacuum pressure are within the failure condition and, as a result, the booster negative pressure sensor is in the offset failure condition, control of the offset failure of the booster negative pressure sensor may be performed in step S300. The failure may be determined when the offset error of the booster negative pressure sensor is in an offset low, the offset error is in an offset high, or the offset error is in an offset high while the pressure obtained by subtracting the atmospheric pressure from the intake-manifold pressure is increased.

Control of the low stuck-at failure, the high stuck-at failure, and the offset failure of the booster negative pressure sensor will be described in detail below. After performing control of the low stuck-at failure, the high stuck-at failure, or the offset failure of the booster negative pressure sensor according to the present invention, a warning may be output in step S70 and then the process may be terminated without performing control of the low vacuum brake assist (LVBA) in step S80.

On the other hand, when values of the booster negative pressure sensor that are detected by the booster negative pressure sensor and detection values of the sensors configured to indirectly sense the booster negative pressure are not normal values, a warning may be output in step S70 and the process may be terminated without performing control of the LVBA in step S80.

Figure 2:
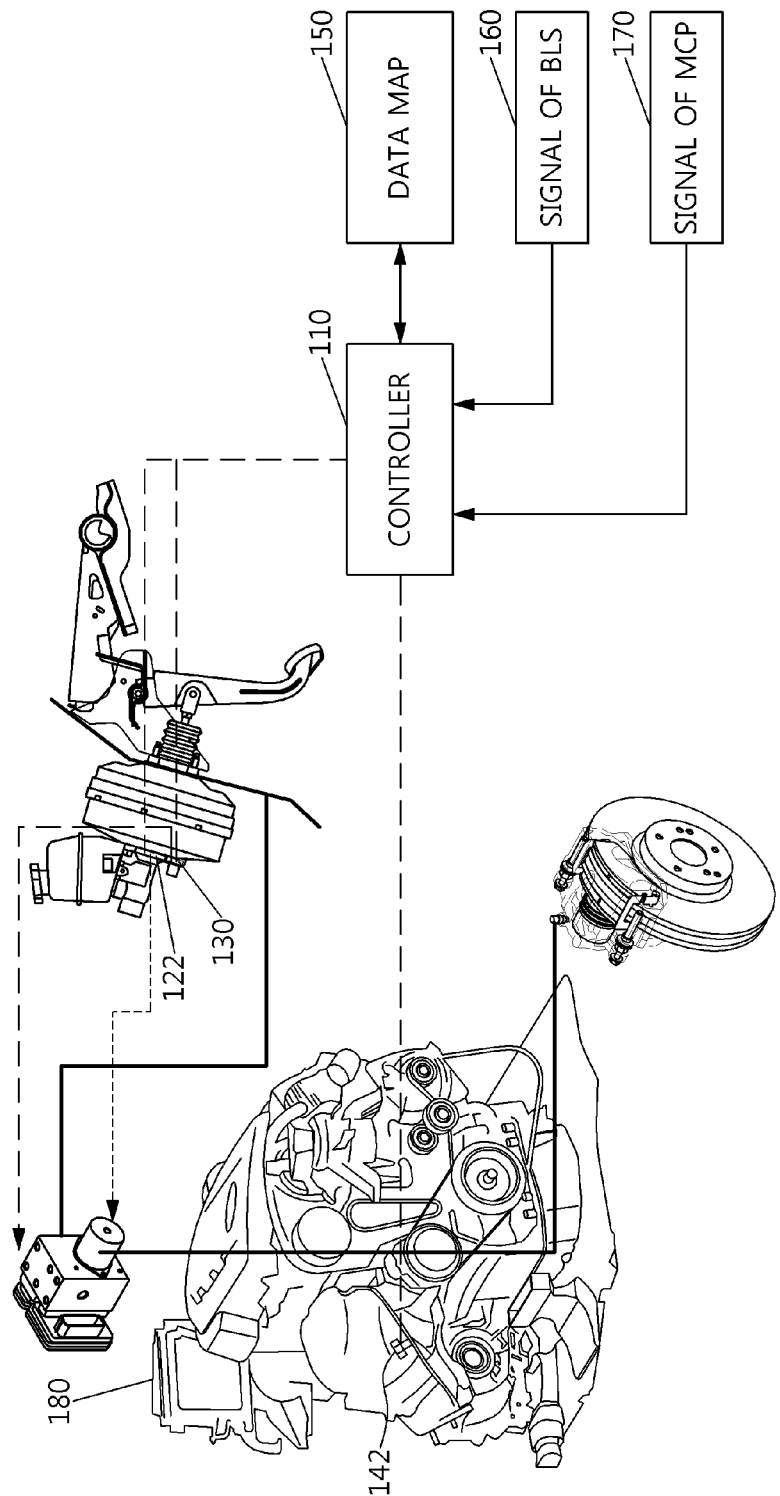
FIG. 2 is a diagram of a system for verifying normal operation of a negative pressure sensor of a brake booster according to an exemplary embodiment of the present invention.

FIG. 2 is a diagram of a system for verifying normal operation of a negative pressure sensor of a brake booster according to an exemplary embodiment of the present invention. Referring to FIG. 2, the system for verifying normal operation of a negative pressure sensor of a brake booster according to an exemplary embodiment of the present invention may include a controller 110, a brake booster 120, a booster pressure sensor 122, an atmospheric pressure sensor 130, an intake-manifold pressure sensor 142, a data map 150, a BLS 160, an MCP 170, and an ESC 180.

In particular, the controller 110 may be configured to receive signals detected by the booster pressure sensor 122 provided in the brake booster 120, the atmospheric pressure sensor 130 and the intake-manifold pressure sensor 142 and may be configured to transmit and receive signals to and from the data map 150 generated as a table in which signals are mapped and stored. In addition, the controller 110 may be configured to receive signals of the BLS 160 and MCP 170, calculate demand values of the braking pressure based on strokes sensed by a pedal stroke measurement sensor and pressure sensed by a sub-master cylinder pressure measurement sensor, operate a motor based on the calculated demand values of the braking pressure, transmit and receive signals to and from the ESC which generates the braking pressure, and detect whether the booster negative pressure sensor is in a failure state.

Figure 3:
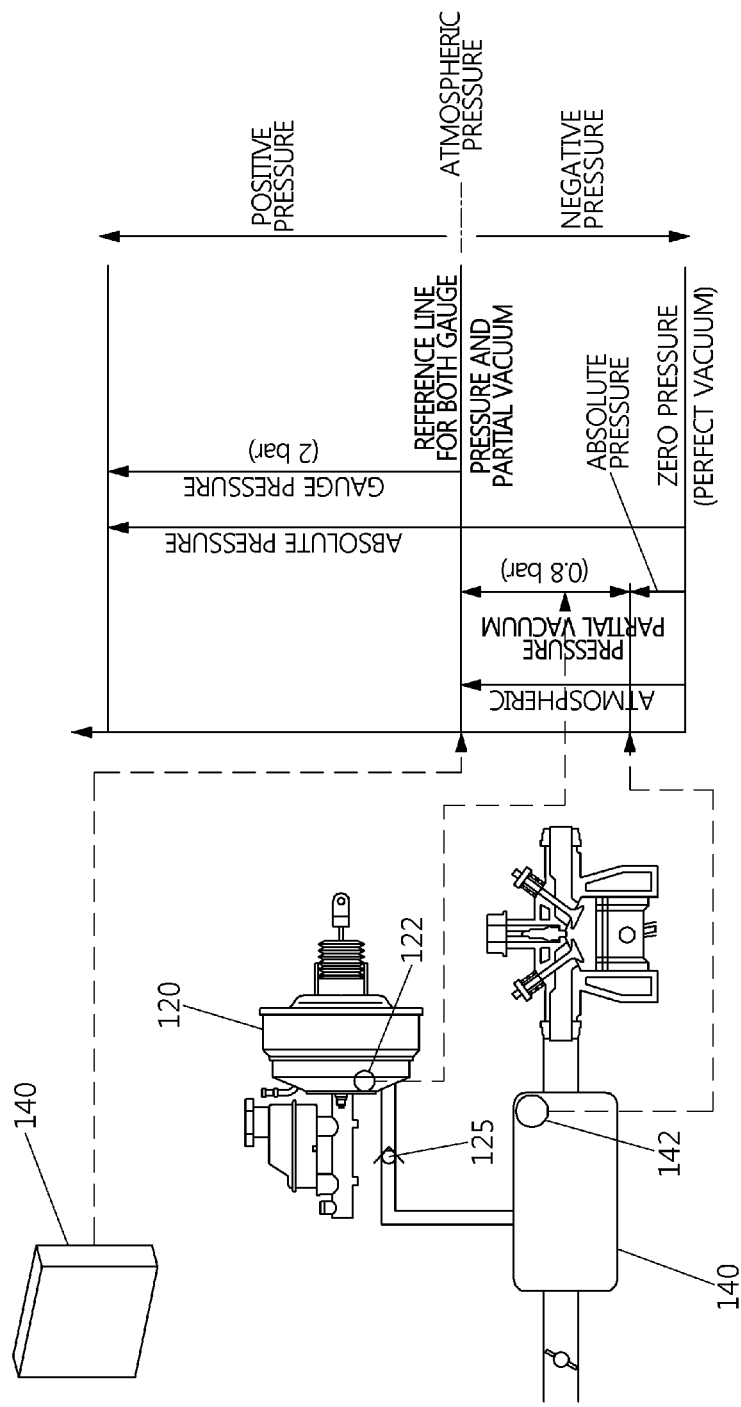
FIG. 3 shows a specific diagram and graph of a system for verifying normal operation of a negative pressure sensor of a brake booster according to an exemplary embodiment of the present invention.

FIG. 3 shows a specific diagram and graph of a system for verifying normal operation of a negative pressure sensor of a brake booster according to an exemplary embodiment of the present invention. Referring to FIG. 3, the system for verifying normal operation of a negative pressure sensor of a brake booster according to an exemplary embodiment of the present invention may include a controller 110, a brake booster 120, a booster pressure sensor 122, an atmospheric pressure sensor 130, an intake-manifold pressure sensor 142, a data map 150, a BLS 160, an MCP 170, and an ESC 180.

A check valve 125 may be disposed between the brake booster 120 and an intake pipe 140. The intake pipe 140 may include the intake-manifold pressure sensor 142. The atmospheric pressure sensor 130 may be disposed within a powertrain control unit (PCU). Further, measurement values measured by the booster pressure sensor 122, the atmospheric pressure sensor 130, and the intake-manifold pressure sensor 142 in accordance with the present invention are plotted in a graph.

Referring to the graph, a line segment parallel to the X-axis indicates atmospheric pressure wherein pressure above the atmospheric pressure refers to positive pressure while pressure below the atmospheric pressure refers to negative pressure. Therefore, the graph shows that the booster negative pressure (relative pressure) is expressed as follows: negative pressure (relative pressure)=−[intake-manifold pressure (absolute pressure)−atmospheric pressure (absolute pressure)].

Figure 4:
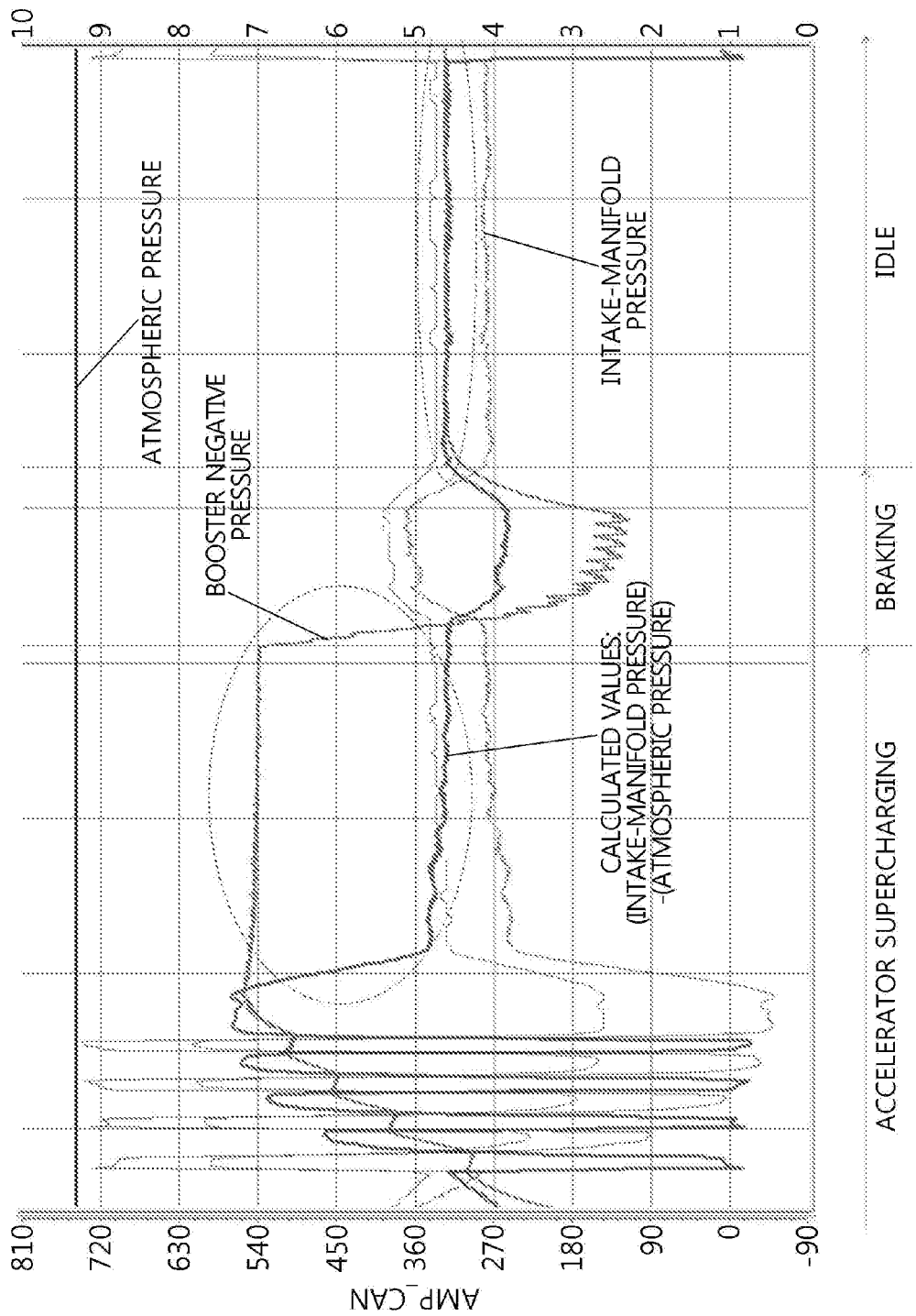
FIG. 4 is a graph showing principle of a method for verifying normal operation of a negative pressure sensor of a brake booster according to an exemplary embodiment of the present invention.

FIG. 4 is a graph showing principle of a method for verifying normal operation of a negative pressure sensor of a brake booster according to an exemplary embodiment of the present invention. FIG. 4 shows that in an accelerator supercharging section, a vacuum of the booster may be maintained using a check valve when the intake-manifold pressure fluctuates after the booster negative pressure is charged whereas the booster negative pressure is rapidly reduced in a braking section and then increases in an idle section where the booster negative pressure corresponds to values obtained by subtracting the atmospheric pressure from the negative pressure of the intake-manifold.

Figure 5:
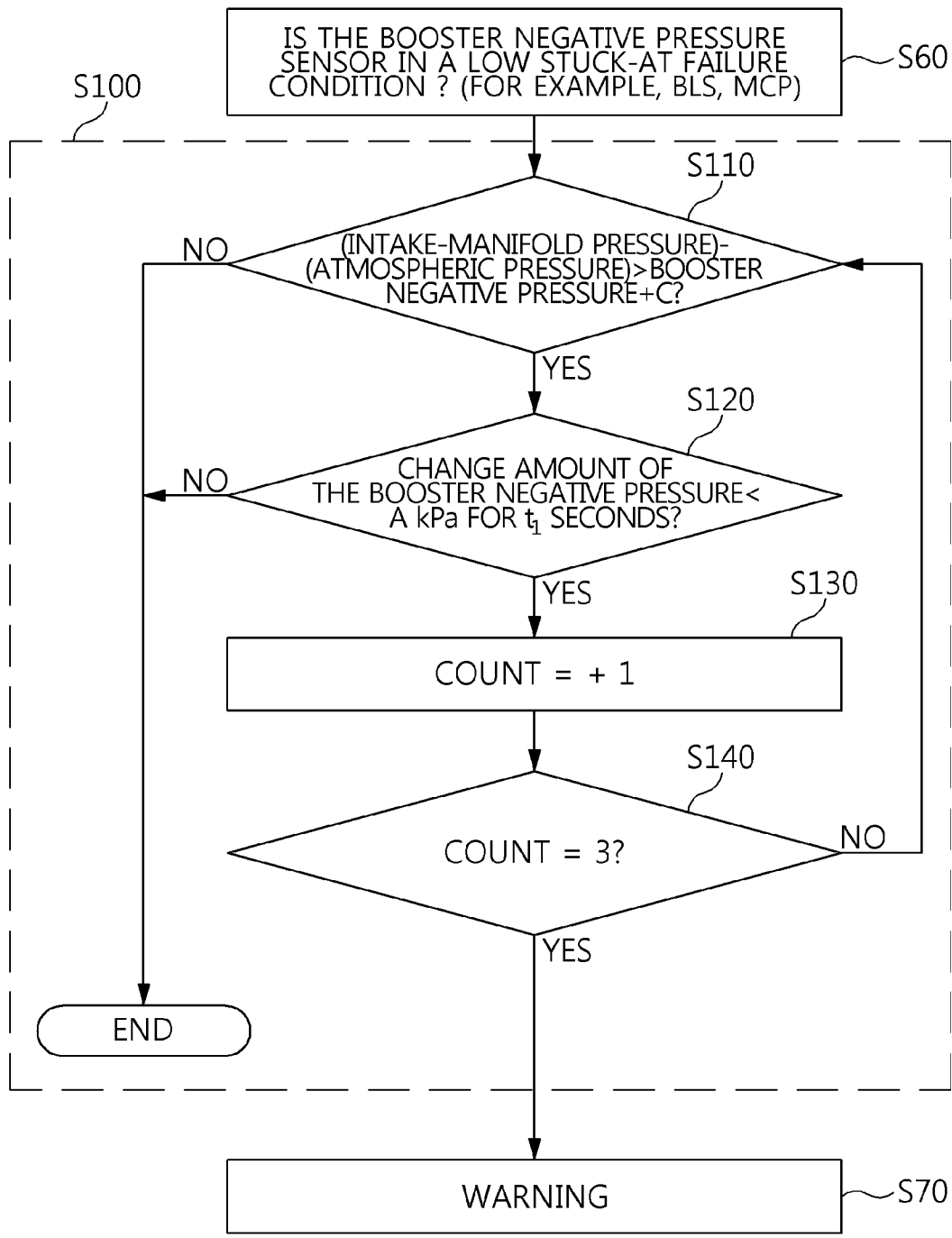
FIG. 5 is a flowchart for control of a low stuck-at failure of a negative pressure sensor of a brake booster in a method for verifying normal operation of a negative pressure sensor of a brake booster according to an exemplary embodiment of the present invention.
Figure 6:
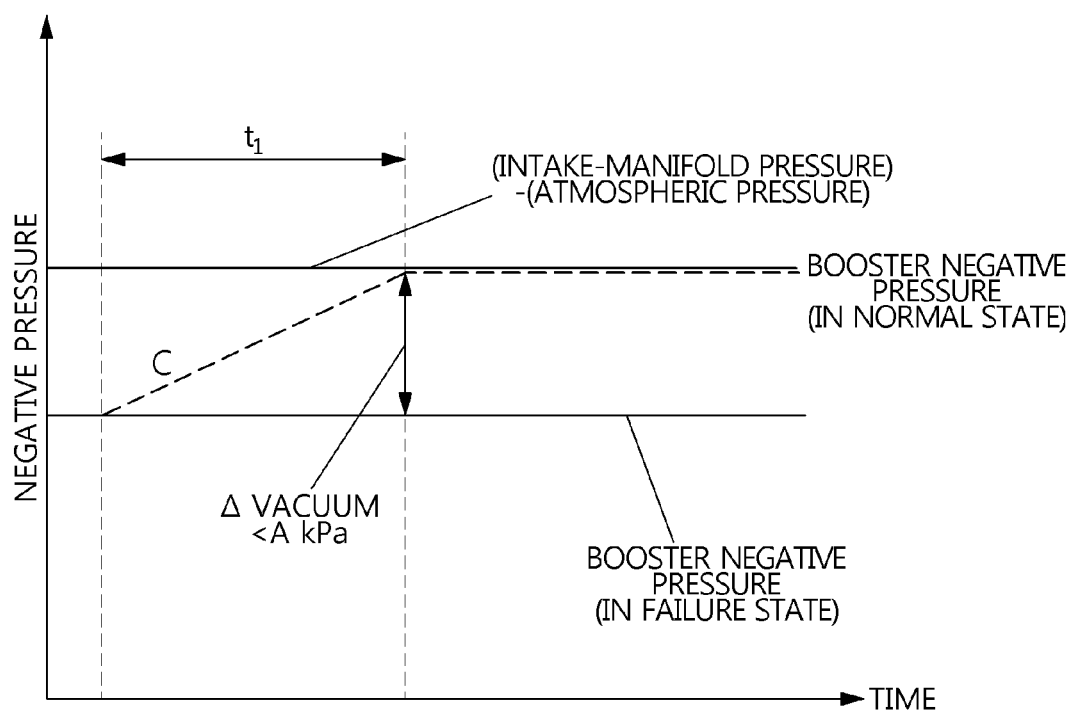
FIG. 6 is a graph of control of a low stuck-at failure of a negative pressure sensor of a brake booster in a method for verifying normal operation of a negative pressure sensor of a brake booster according to an exemplary embodiment of the present invention in FIG. 5.

FIG. 5 is a flowchart for control of a low stuck-at failure of a negative pressure sensor of a brake booster in a method for verifying normal operation of a negative pressure sensor of a brake booster according to an exemplary embodiment of the present invention. FIG. 6 is a graph of control of a low stuck-at failure of a negative pressure sensor of a brake booster in a method for verifying normal operation of a negative pressure sensor of a brake booster according to an exemplary embodiment of the present invention in FIG. 5.

Referring to FIGS. 5 and 6 together, shown therein are flowcharts for control of the low stuck-at failure of the booster negative pressure sensor to be performed in step S100 of FIG. 1. Determination of the failure condition of the booster negative pressure sensor may include: determining in step S60 whether the booster negative pressure sensor is in the low stuck-at failure condition, performing control of the low stuck-at failure of the booster negative pressure sensor in step S100 in response to determining that the booster negative pressure sensor is in the low stuck-at failure condition, and determining in step S110 whether the pressure obtained by subtracting the atmospheric pressure from the intake-manifold pressure is greater than a value obtained by adding set value, that is, C kPa to the booster negative pressure wherein, C represents reference value of determining a failure of the booster negative pressure.

Subsequently, if the value obtained by subtracting the atmospheric pressure from the intake-manifold pressure is greater than the value obtained by adding C kPa to the booster negative pressure, whether change amounts of the booster negative pressure are less than A kPa for $t_1$ seconds may be determined in step S120, wherein, A kPa means value obtained by subtracting the booster negative pressure at the time of failure from the booster negative pressure at the time of normal operation.

If the change amounts of the booster negative pressure sensor are less than A kPa, the corresponding number of times may be counted in step S130 and, in response to determining in step S140 that the number of times is repeated more than k times, the booster negative pressure sensor may be determined to be in a failure state and a warning may be output in step S70. For example, k may be, for example, 3, but is not limited thereto. However, if the value obtained by subtracting the atmospheric pressure from the intake-manifold pressure is less than the value obtained by adding C kPa to the booster negative pressure, or the change amounts of the booster negative pressure are greater than A kPa for $t_1$ seconds, the process may be terminated.

Figure 7:
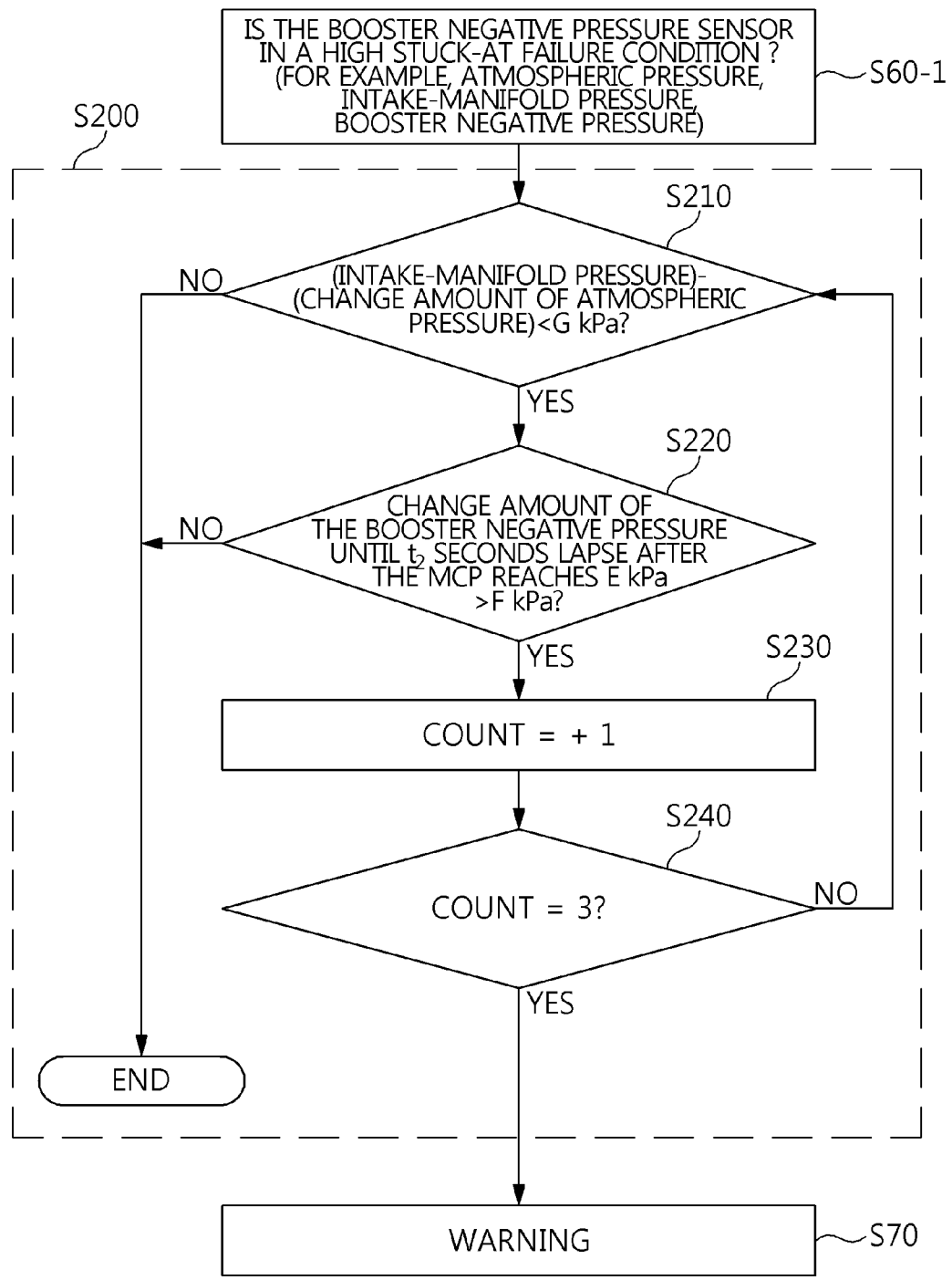
FIG. 7 is a flowchart for control of a high stuck-at failure of a negative pressure sensor of a brake booster in a method for verifying normal operation of a negative pressure sensor of a brake booster according to an exemplary embodiment of the present invention.
Figure 8:
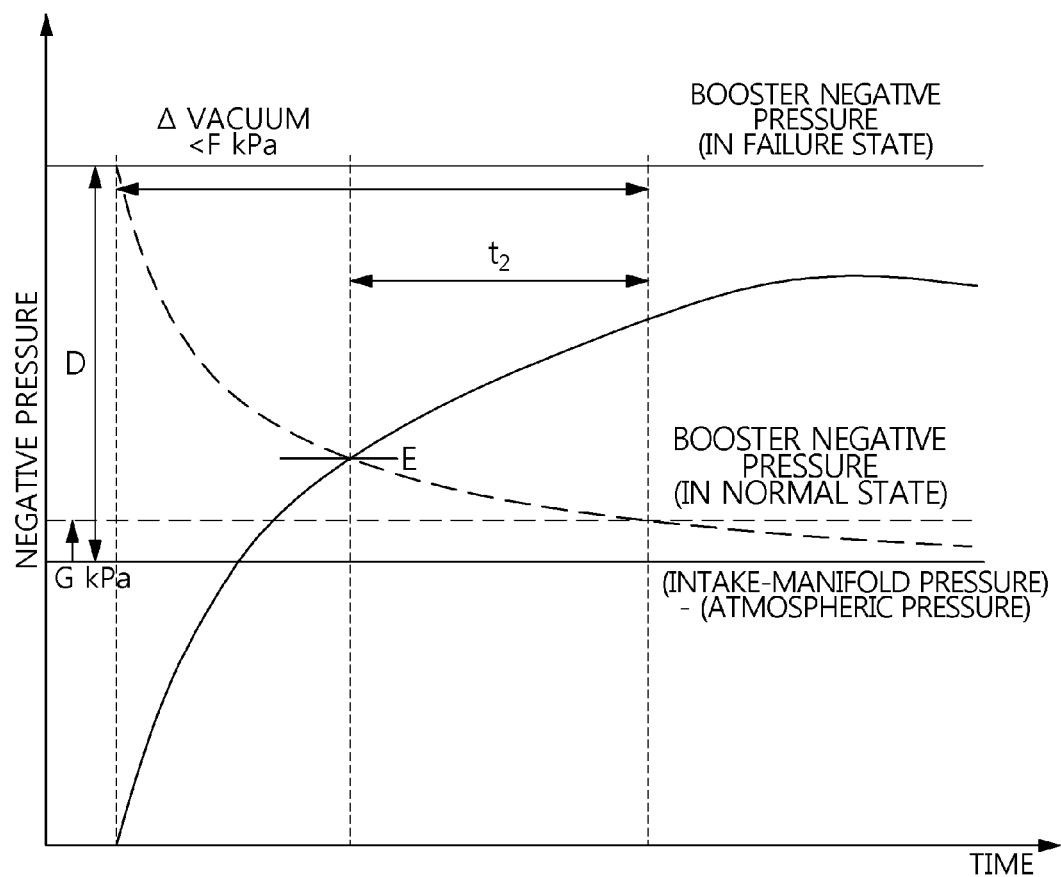
FIG. 8 is a graph of control of a high stuck-at failure of a negative pressure sensor of a brake booster in a method for verifying normal operation of a negative pressure sensor of a brake booster according to an exemplary embodiment of the present invention in FIG. 7.

FIG. 7 is a flowchart for control of a high stuck-at failure of a negative pressure sensor of a brake booster in a method for verifying normal operation of a negative pressure sensor of a brake booster according to an exemplary embodiment of the present invention. FIG. 8 is a graph of control of a high stuck-at failure of a negative pressure sensor of a brake booster in a method for verifying normal operation of a negative pressure sensor of a brake booster according to an exemplary embodiment of the present invention in FIG. 7.

Referring to FIGS. 7 and 8 together, whether the booster negative pressure sensor is in the low stuck-at failure condition may be determined in S60 and, in response to determining that the booster negative pressure sensor is not in the failure condition, then the controller may be configured to determine in step S60-1 whether the booster negative pressure sensor is in the high stuck-at failure condition. In response to determining that the booster negative pressure sensor is in the high stuck-at failure condition, then control of the high stuck-at failure of the booster negative pressure sensor may be performed in step S200.

Additionally, in response to determining in step S210 that the value obtained by subtracting the change amount of the atmospheric pressure is less than G kPa and in response to determining in step S220 that change amounts of the booster negative pressure until $t_2$ seconds lapse after the MCP reaches E kPa are greater than the booster negative pressure, F kPa, at the time of failure, the corresponding number of times may be counted in step S230. In response to determining in step S240 that the number of times is repeated more than k times, the booster negative pressure sensor may be determined to be in a failure state and a warning may be output in step S70. In particular, m may be, for example, 3, but is not limited thereto. In addition, G may be a value obtained by subtracting from the booster negative pressure under normal operation the value obtained by subtracting the intake-manifold pressure from the atmospheric pressure and may be 1 kPa but is not limited thereto.

Figure 9:
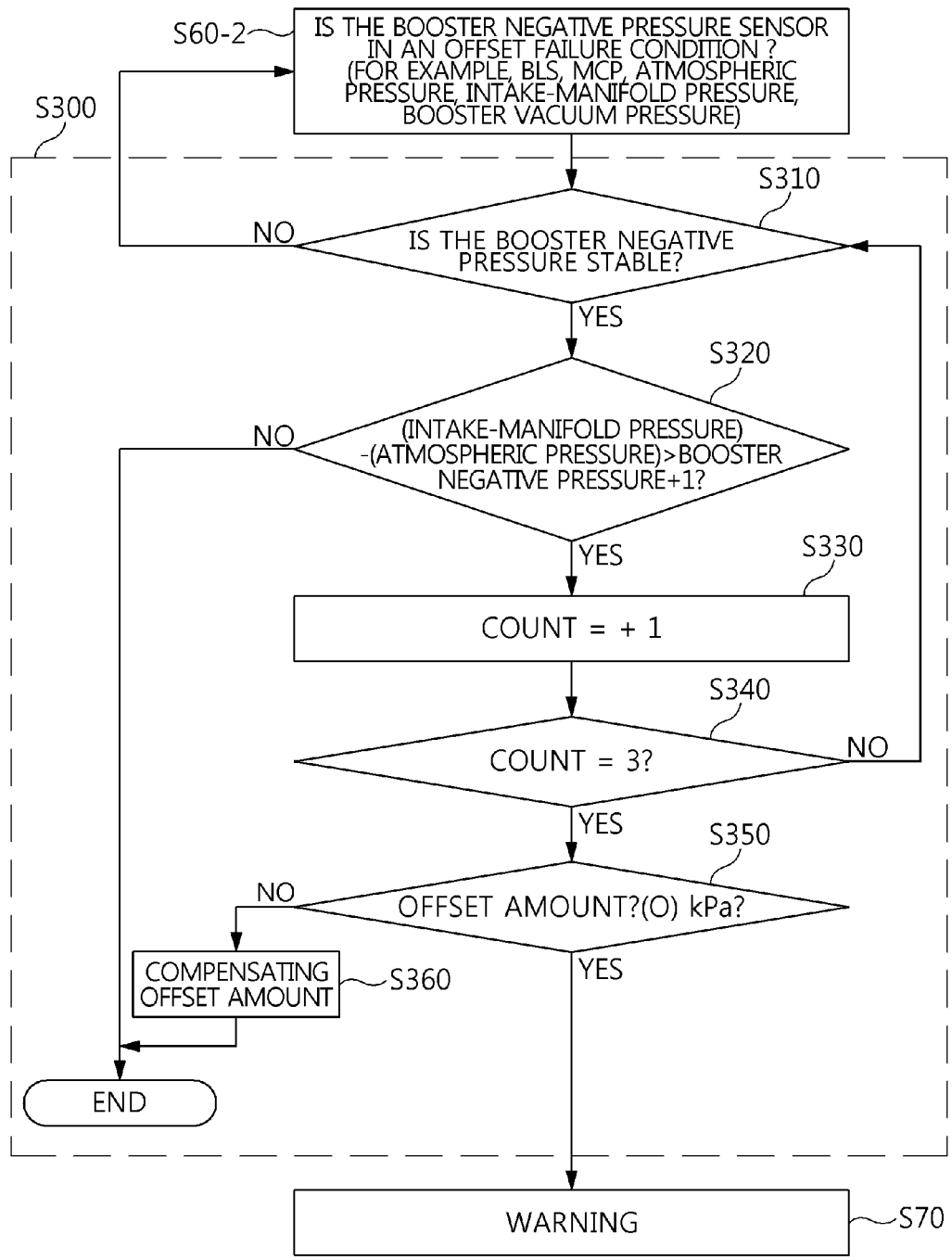
FIG. 9 is a flowchart for control of an offset failure of a negative pressure sensor of a brake booster in a method for verifying normal operation of a negative pressure sensor of a brake booster according to an exemplary embodiment of the present invention.
Figure 10:
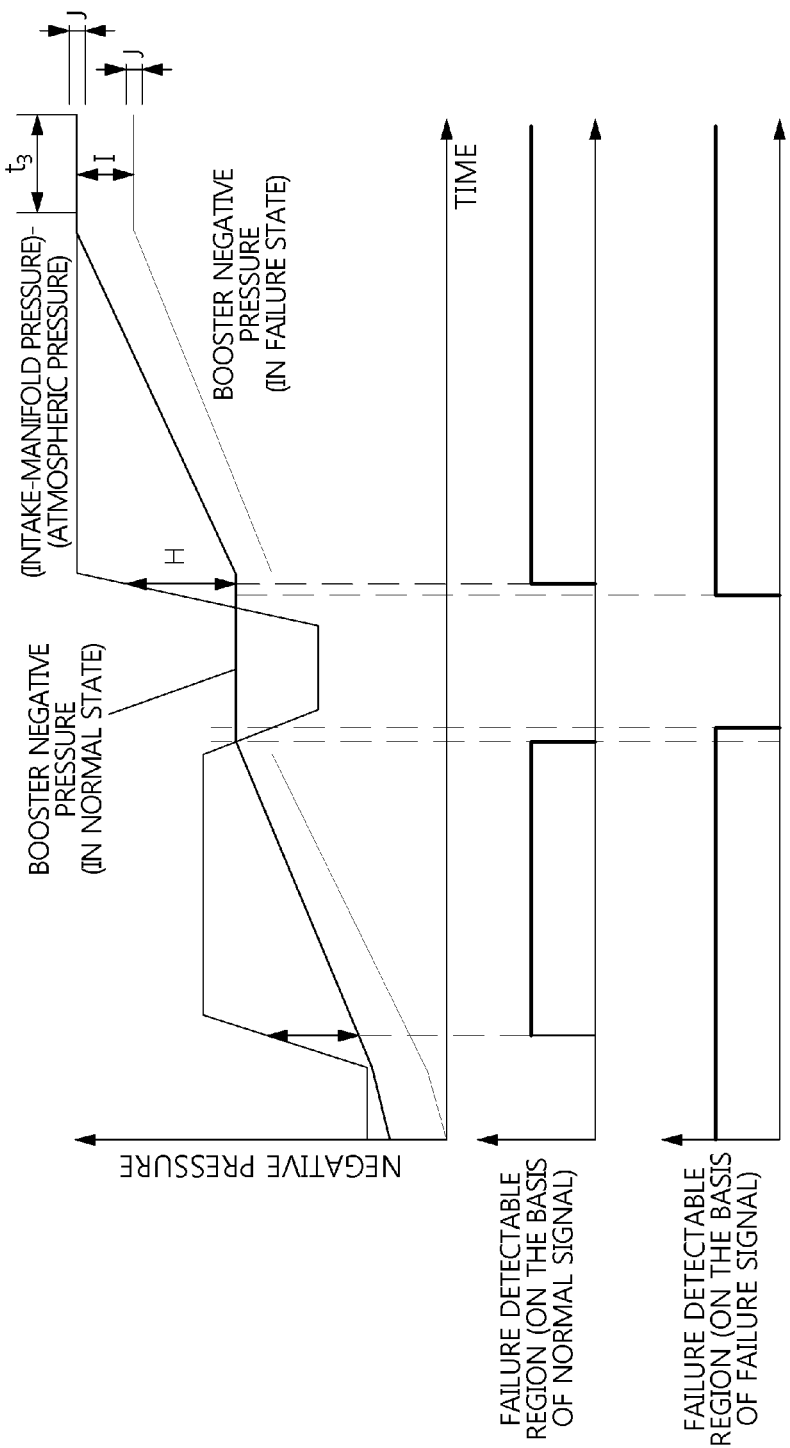
FIG. 10 is a graph of control of an offset low failure of a negative pressure sensor of a brake booster in a method for verifying normal operation of a negative pressure sensor of a brake booster according to an exemplary embodiment of the present invention in FIG. 9.
Figure 11:
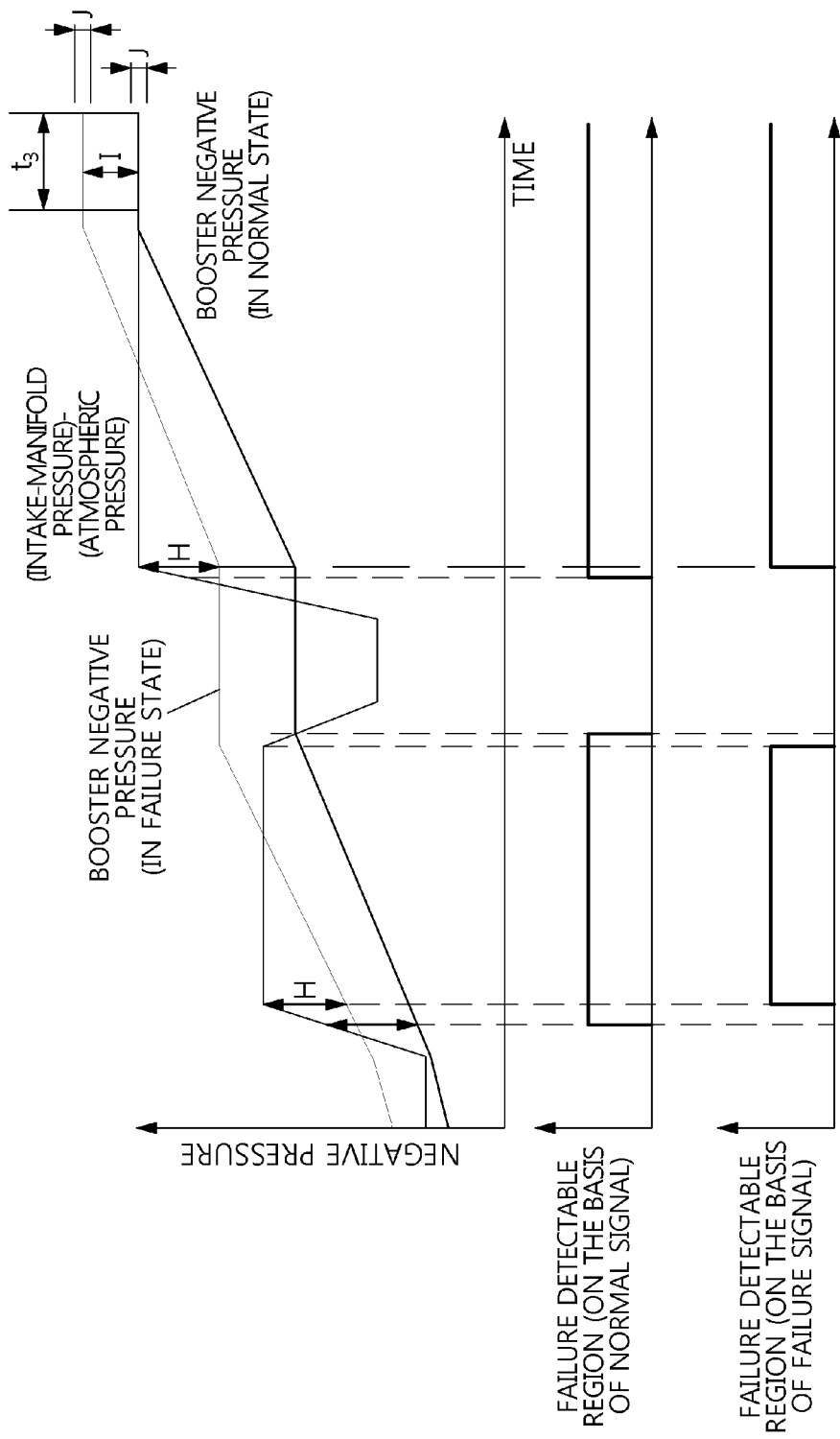
FIG. 11 is a graph of control of an offset high failure of a negative pressure sensor of a brake booster in a method for verifying normal operation of a negative pressure sensor of a brake booster according to an exemplary embodiment of the present invention.
Figure 12:
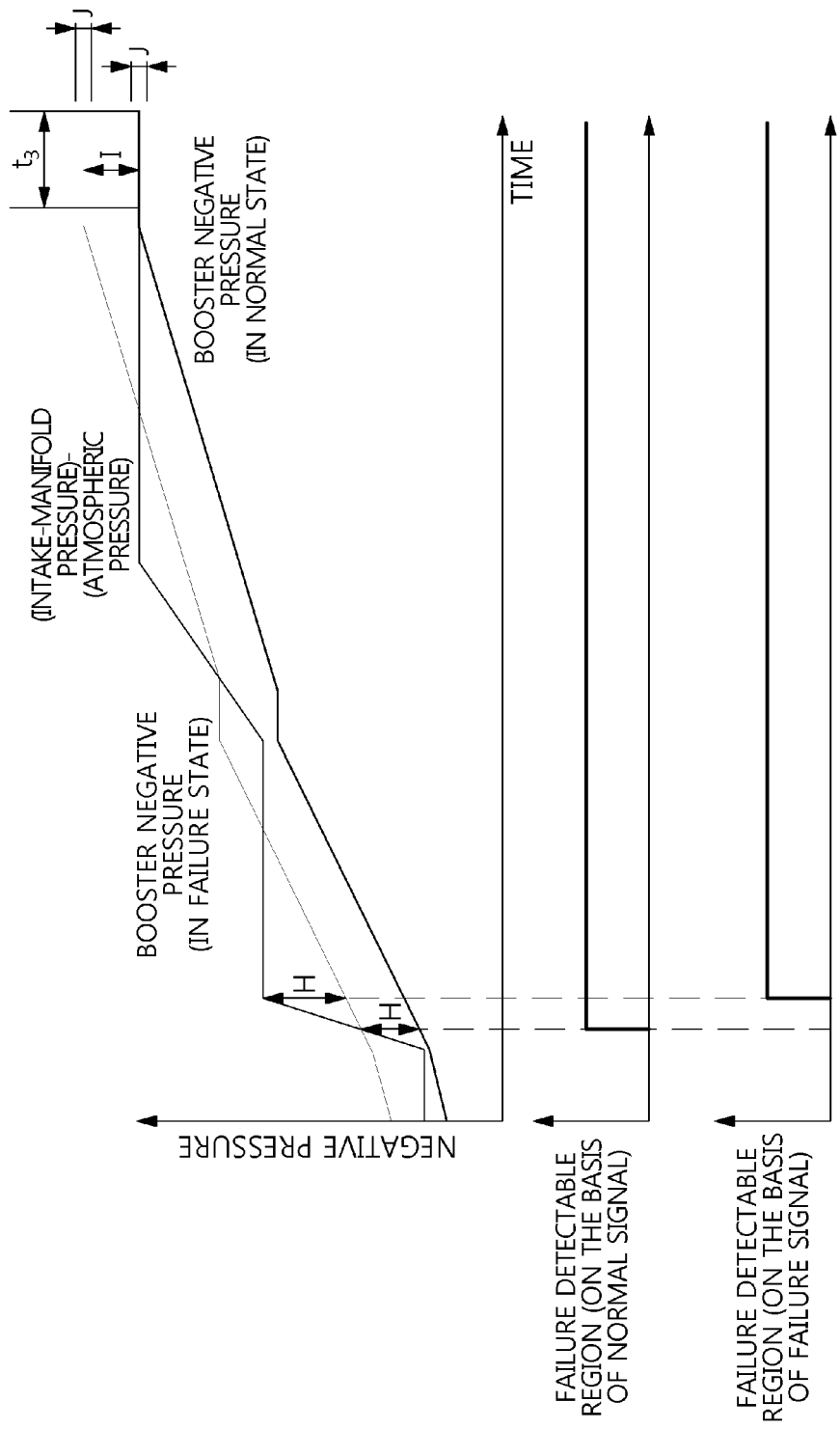
FIG. 12 is a graph of control of a failure in increasing negative pressure of a brake booster in an offset high state of a negative pressure sensor of the brake booster in another method for verifying normal operation of a negative pressure sensor of a brake booster according to an exemplary embodiment of the present invention.

FIG. 9 is a flowchart for control of an offset failure of a negative pressure sensor of a brake booster in a method for verifying normal operation of a negative pressure sensor of a brake booster according to an exemplary embodiment of the present invention; FIG. 10 is a graph of control of an offset low failure of a negative pressure sensor of a brake booster in a method for verifying normal operation of a negative pressure sensor of a brake booster according to an exemplary embodiment of the present invention in FIG. 9; FIG. 11 is a graph of control of an offset high failure of a negative pressure sensor of a brake booster in a method for verifying normal operation of a negative pressure sensor of a brake booster according to an exemplary embodiment of the present invention; and FIG. 12 is a graph of control of a failure in increasing negative pressure of a brake booster in an offset high state of a negative pressure sensor of the brake booster in another method for verifying normal operation of a negative pressure sensor of a brake booster according to an exemplary embodiment of the present invention.

Referring to FIGS. 9 to 12 together, in response to determining that the booster negative pressure sensor is not in the high stuck-at failure condition, then whether the booster negative pressure sensor is in an offset failure condition may be determined in step S60-2. For example, if the value obtained by subtracting the atmospheric pressure from the intake-manifold pressure is greater than the value obtained by adding H kPa to the booster vacuum pressure, the value obtained by subtracting the atmospheric pressure from the intake-manifold pressure is changed by J kPa or more during monitoring, and also the value obtained by subtracting the atmospheric pressure from the intake-manifold pressure is reduced and less than the booster negative pressure during monitoring, then control of the offset failure of the booster negative pressure sensor may be performed in step S300. In particular, H kPa indicates the value obtained by subtracting the booster negative pressure at the time of failure from the value obtained by subtracting the atmospheric pressure from the intake-manifold pressure and J kPa indicates the error value of failure determination.

Meanwhile, if the value obtained by subtracting the atmospheric pressure from the intake-manifold pressure is changed by J kPa or more during monitoring, then stable and reference engine vacuum pressure may be reset from the corresponding time point. If the value obtained by subtracting the atmospheric pressure from the intake-manifold pressure is greater than the value obtained by adding H kPa to the booster vacuum pressure when the value obtained by subtracting the atmospheric pressure from the intake-manifold pressure is reduced and less than the booster negative pressure, then monitoring may be stopped.

Further, in response to determining that the booster negative pressure sensor is in the offset failure condition, then control of the offset failure of the booster negative pressure sensor may be performed in step S300 and whether the booster negative pressure is stable may be determined in step S310. When the booster negative pressure is determined as being stable, whether difference between the booster's average negative pressure and the intake-manifold pressure is equal to or greater than I kPa may be determined in step S320. If the difference is repeated n times or more, a failure may be detected. In particular, I is the difference between the booster's average negative pressure and the intake-manifold pressure. n may be 3 but is not limited thereto.

For example, if the value obtained by subtracting the atmospheric pressure from the intake-manifold pressure is greater than the value obtained by adding I kPa to the booster negative pressure, the corresponding number of times is counted in step S330 and, in response to determining as being repeated n times or more in step S340, whether offset amount is greater than 0 kPa may be determined in step S350. If the offset amount is less than 0 kPa, a warning may be output in step S70 and then the process may be terminated.

In other words, for the failure detection condition when the booster negative pressure sensor satisfies an offset failure entry condition, whether charging of the booster negative pressure with the intake-manifold pressure is completed may be determined when the booster negative pressure is changed by J kPa or less for t3 seconds and maintained as being stable, and when difference of I kPa or more is detected between the booster's average negative pressure under the stable state and the intake-manifold pressure occurs and the occurrence of the difference is repeated n times or more, a failure may be detected.

However, in response to determining that the booster negative pressure sensor is not in the stable state, whether the booster negative pressure sensor is in the offset failure condition may be determined in step S60-2. Further, if the value obtained by subtracting the atmospheric pressure from the intake-manifold pressure is less than the value obtained by adding I kPa to the booster negative pressure, the process may be terminated, while if the offset amount is greater than 0 kPa, the offset amount may be corrected in step S360 and then the process may be terminated.

Furthermore, when the booster negative pressure is not in the stable state, if the value obtained by subtracting the atmospheric pressure from the intake-manifold pressure is less than the booster negative pressure, whether the booster negative pressure sensor is in the offset failure condition may be determined again (S60-2). When the booster negative pressure is not in the stable state, if the value obtained by subtracting the atmospheric pressure from the intake-manifold pressure is greater than the booster negative pressure, whether the value obtained by subtracting the atmospheric pressure from the intake-manifold pressure is greater than the value obtained by adding H kPa to the booster vacuum pressure may be determined.

According to the present invention, a failure detectable area at the time when the booster negative pressure sensor is in an offset failure is different between the normal signal and the failure signal. First, the failure detectable region for a normal signal corresponds to a section under the stable state in a region where the value obtained by subtracting the atmospheric pressure from the intake-manifold pressure is greater than H kPa. The failure detectable region for a failure signal corresponds to a section under the stable state in a region where the value obtained by subtracting the atmospheric pressure from the intake-manifold pressure is greater than H kPa. The figures show that the failure detectable regions for the normal signal and the failure signal are different in the position where the region in which the value obtained by subtracting the atmospheric pressure from the intake-manifold pressure is greater than H kPa starts and also in a region in which the value obtained by subtracting the atmospheric pressure from the intake-manifold pressure starts to be less than H kPa.

Figure 13:
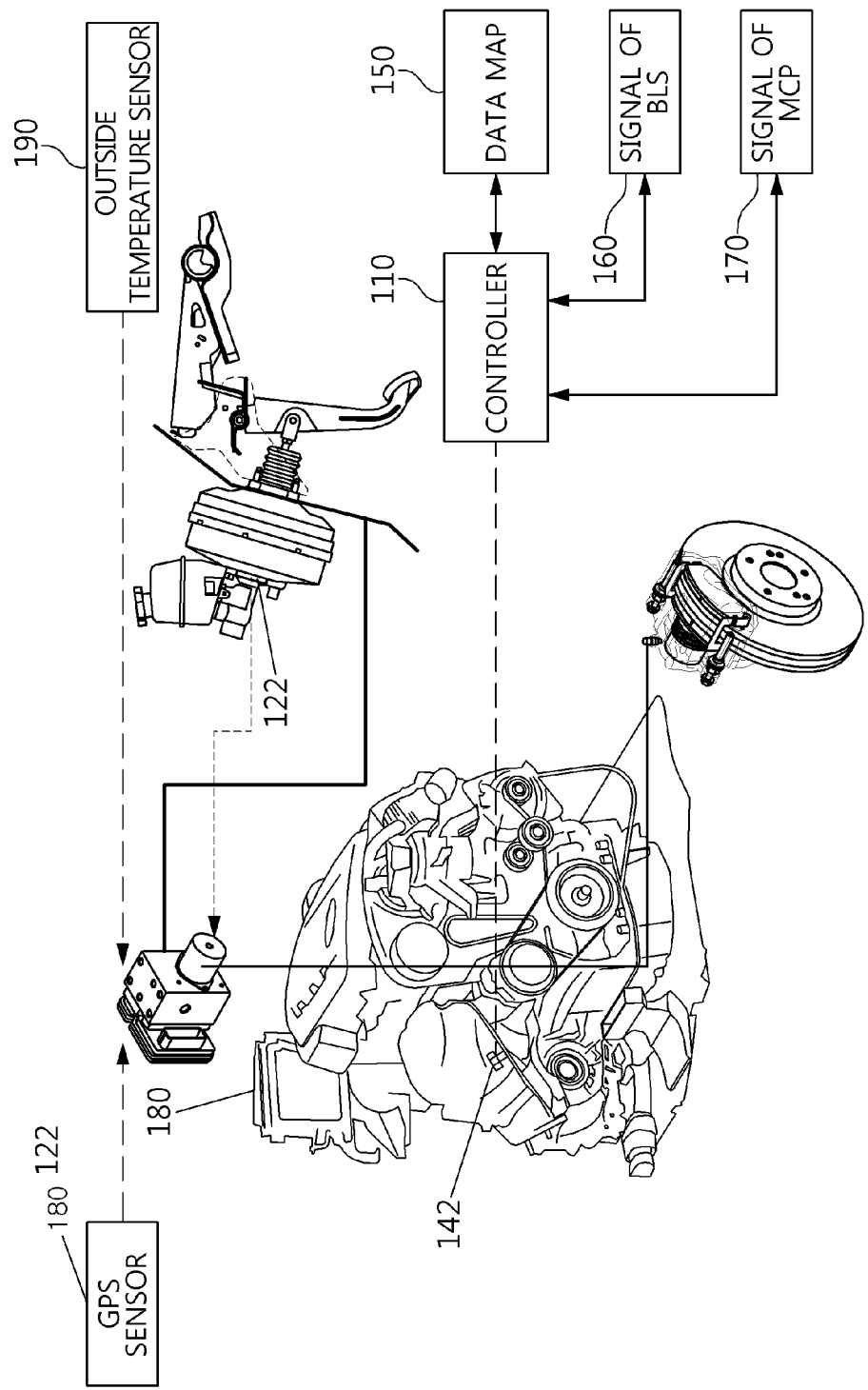
FIG. 13 is a diagram of a system for verifying normal operation of a negative pressure sensor of a brake booster according to another exemplary embodiment of the present invention.

FIG. 13 is a diagram of a system for verifying normal operation of a negative pressure sensor of a brake booster according to another exemplary embodiment of the present invention. Referring to FIG. 13, the system for verifying normal operation of a negative pressure sensor of a brake booster according to another exemplary embodiment of the present invention may include a controller 110, a brake booster 120, a booster pressure sensor 122, a GPS sensor 180, a temperature sensor 190, a data map 150, a BLS 160, an MCP 170 and an ESC 180.

In particular, the controller 110 may be configured to receive signals from the booster pressure sensor 122 provided in the brake booster 120, the GPS sensor 180, and the temperature sensor 190 and transmit and receive signals to and from the data map 150. The controller 110 may also be configured to receive signals from the BLS 160 and the MCP 170 and transmit and receive signals to and from the ESC 180 to detect whether the booster negative pressure sensor is in a failure state.

The method and the system for verifying normal operation of a negative pressure sensor of a brake booster according to the present invention may provide advantageous effects that robustness of detection of malfunction and failure of the booster negative pressure sensor may be improved by monitoring values directly detected by the booster negative pressure sensor with values detected indirectly using sensors mounted within a vehicle when negative pressure of the booster is determined and thus, the overall cost may be reduced and safety may be enhanced.

It will be understood by those skilled in the art that the present invention may be embodied in other specific forms without departing from the spirit or essential characteristics thereof. Therefore, it should be understood that the exemplary embodiments as described above are merely selected among various possible examples and provided as the exemplary embodiments of the present invention in order for those skilled in the art to understand the present invention and therefore the technical spirit of the present invention is not necessarily restricted or limited only by the exemplary embodiments provided and that various changes, additions and modifications may be made without departing from the spirit of the present invention and other exemplary embodiments equivalent thereto are possible.

The scope of the present invention is defined by the appended claims rather than by the foregoing description and all changes or modifications derived from the meaning and scope of the claims and the equivalents thereof should be construed to be covered by the scope of the present invention. The terms and words used in the specification and claims are defined on the basis of the principle that the inventor can define the concept of a term appropriately in order to describe his/her own invention in the best way and should not be construed as only their ordinary or dictionary sense. In addition, it is natural that the order of configurations described in the foregoing description is not necessarily required to be performed in a time-series order and that although the order of carrying out each of the configurations or steps is changed, if this change fulfills the gist of the present invention, it will fall within the scope of the present invention.

What is claimed is:

1. A method for verifying normal operation of a booster negative pressure sensor, comprising:
   identifying, by a controller, whether values of the booster negative pressure sensor, an intake-manifold pressure sensor, and an atmospheric pressure sensor are detected, respectively;
   detecting, by the controller, whether a brake lamp switch (BLS) is turned on, a main cylinder pressure (MCP), an atmospheric pressure, an intake-manifold pressure, a booster negative pressure, and a booster vacuum pressure;
   distinguishing, by the controller, compensation factors for compensating a malfunction of the booster negative pressure sensor based on any combination of whether the BLS is turned on, the MCP, the atmospheric pressure, the intake-manifold pressure, the booster negative pressure, and the booster vacuum pressure;
   determining, by the controller, any one of a low stuck-at condition, a high stuck-at condition, and an offset error condition of the booster negative pressure sensor based on the compensation factors for compensating the malfunction of the booster negative pressure sensor; and
   switching, by the controller, a low vacuum brake assist (LVBA) that has used values of the booster negative pressure sensor in the low stuck-at condition, the high stuck-at condition, or the offset error condition to a non-control state.

2. The method according to claim 1, further comprising:
   determining, by the controller, whether values measured by the booster negative pressure sensor and values measured by sensors configured to indirectly sense the booster negative pressure are normal.

3. The method according to claim 1, wherein the booster negative pressure sensor is determined to be in the low stuck-at condition based on whether the BLS is turned on, the MCP, the atmospheric pressure, the intake-manifold pressure, and the booster negative pressure.

4. The method according to claim 3, wherein when the booster negative pressure sensor is in the low stuck-at condition, a failure determination condition includes determining a failure based on the BLS being turned off, a set pressure of the MCP, a pressure obtained by subtracting the atmospheric pressure from the intake-manifold pressure and adding the pressure to the booster negative pressure under a non-braking state, and repetition of change amounts of the booster negative pressure within a set value.

5. The method according to claim 4, wherein the failure determination condition is when the pressure of the MCP is less than the set pressure and is greater than the pressure obtained by subtracting the atmospheric pressure from the intake-manifold pressure and adding the pressure to the booster negative pressure under the non-braking state and the change amounts of the booster negative pressure are repeated within the set value.

6. The method according to claim 5, wherein the repetition within the set value is on condition that the change amounts are less than the set value for a predetermined time.

7. The method according to claim 1, wherein the booster negative pressure sensor is determined to be in the high stuck-at condition based on whether the MCP is turned on, the atmospheric pressure, the intake-manifold pressure, and the booster negative pressure.

8. The method according to claim 7, wherein when the booster negative pressure sensor is in the high stuck-at condition, a failure determination condition includes determining a failure based on a pressure obtained by subtracting the atmospheric pressure from the intake-manifold pressure, a pressure obtained by subtracting a predetermined pressure from the booster negative pressure sensor, a pressure obtained by subtracting a change amount of the atmospheric pressure from the intake-manifold pressure, and repetition of change amounts of the booster negative pressure within a set value.

9. The method according to claim 8, wherein the failure determination condition includes determining the failure when the pressure obtained by subtracting the atmospheric pressure from the intake-manifold pressure is less than pressure obtained by subtracting a predetermined pressure from the booster negative pressure sensor, a pressure obtained by subtracting a change amount of the atmospheric pressure from the intake-manifold pressure is less than a set pressure, and the change amounts of the booster negative pressure are repeated within the set value for a predetermined time.

10. The method according to claim 9, wherein the repetition within the set value is on condition that the change amounts are less than the set value for a predetermined time.

11. The method according to claim 1, wherein occurrence of the offset error condition of the booster negative pressure sensor is determined based on whether the BLS is turned on, the MCP, the atmospheric pressure, the intake-manifold pressure, the booster negative pressure, and the booster vacuum pressure.

12. The method according to claim 11, wherein when the booster negative pressure sensor is in the offset error condition, a failure determination condition includes determining a failure based on the BLS being turned off, a set pressure of the MCP, a pressure obtained by subtracting the atmospheric pressure from the intake-manifold pressure and adding the pressure to the booster negative pressure, a pressure obtained by subtracting the atmospheric pressure from the intake-manifold pressure, the booster negative pressure, charging of the booster negative pressure from the intake-manifold pressure, and repetition of the booster negative pressure and the intake-manifold pressure within a set value.

13. The method according to claim 12, wherein the failure determination condition includes determining the failure when the BLS is turned off; the MCP is less than the set pressure; the pressure obtained by subtracting the atmospheric pressure from the intake-manifold pressure i greater than pressure obtained by adding a predetermined pressure to the booster vacuum pressure; the pressure obtained by subtracting the atmospheric pressure from the intake-manifold pressure is changed above the set value; the pressure obtained by subtracting the atmospheric pressure from the intake-manifold pressure is reduced and is less than the booster negative pressure; and the booster negative pressure is determined as being maintained stable due to the booster negative pressure being changed below the set value and a charge of the booster negative pressure from the intake-manifold pressure is determined as having been completed and the booster negative pressure and the intake-manifold pressure are repeated within the set value.

14. The method according to claim 13, wherein the repetition within the set value is on condition that it is equal to or greater than the set value for a predetermined time.

15. The method according to claim 11, wherein a failure is detected when the offset error condition of the booster negative pressure sensor is in an offset low, when the offset error condition is in an offset high, or when the offset error condition is in an offset high and the pressure obtained by subtracting the atmospheric pressure from the intake-manifold pressure is increased.

16. The method according to claim 11, wherein the method further includes:
    compensating, by the controller, the malfunction of the booster negative pressure sensor by using malfunction compensation factors when the booster negative pressure sensor is in the offset error condition.

17. A system for verifying normal operation of a negative pressure sensor of a brake booster, comprising:
    a controller including a processor programmed to perform verification of normal operation of the negative pressure sensor and a memory configured to store information generated by the processor, wherein the controller is configured to receive signals from a booster pressure sensor within a brake booster, an atmospheric pressure sensor, and an intake-manifold pressure sensor;
    a data map as a table in which signals are mapped and stored in the memory and configured to transmit and receive data to and from the data map;
    a brake lamp switch (BLS) and a main cylinder pressure (MCP) configured to transmit a signal to the controller; and
    an electronic stability control (ESC) configured to transmit a signal to the controller, wherein normal operation of the booster negative pressure sensor is verified by mutually verifying values measured by the booster negative pressure sensor and values measured by sensors configured to indirectly sense the booster negative pressure.

18. The system according to claim 17, further comprising:
a global positioning system (GPS) sensor configured to measure an altitude and a temperature sensor configured to measure an outside temperature.

* * * * *